US007704123B2

(12) United States Patent
Marsic et al.

(10) Patent No.: US 7,704,123 B2
(45) Date of Patent: Apr. 27, 2010

(54) HANDLE ASSEMBLY FOR A CONCRETE SAW

(75) Inventors: Martin D. Marsic, Highland Heights, OH (US); Kent A. Smith, Newbury, OH (US)

(73) Assignee: Diamond Products, Limited, Elyria, OH (US)

( * ) Notice: Subject to any disclaimer, the term of this patent is extended or adjusted under 35 U.S.C. 154(b) by 181 days.

(21) Appl. No.: 11/733,976

(22) Filed: Apr. 11, 2007

(65) Prior Publication Data

US 2008/0252133 A1 Oct. 16, 2008

(51) Int. Cl.

| | |
|---|---|
| ***B24B 29/00*** | (2006.01) |
| ***B24B 51/00*** | (2006.01) |
| ***B28D 1/04*** | (2006.01) |
| ***E21C 25/00*** | (2006.01) |
| ***B23D 47/02*** | (2006.01) |
| ***B23D 51/02*** | (2006.01) |
| ***B23D 51/04*** | (2006.01) |
| ***B23D 59/00*** | (2006.01) |
| ***B27B 3/28*** | (2006.01) |
| ***B27B 9/00*** | (2006.01) |

(52) U.S. Cl. ..................... 451/8; 125/13.01; 125/13.03; 299/39.3; 30/370

(58) Field of Classification Search ..................... 451/8; 125/13.01, 13.03, 16.01, 14, 38; 299/39.3; 30/370

See application file for complete search history.

(56) References Cited

U.S. PATENT DOCUMENTS 4,889,675 A * 12/1989 Chiuminatta et al. ........ 264/154
4,903,680 A * 2/1990 Chiuminatta et al. ..... 125/13.01
4,928,662 A * 5/1990 Chiuminatta et al. ..... 125/13.01
4,938,201 A * 7/1990 Chiuminatta et al. ..... 125/13.01
5,039,118 A * 8/1991 Huang ................... 280/47.371
5,056,499 A * 10/1991 Chiuminatta et al. .......... 125/14
5,062,769 A * 11/1991 Ortolano ...................... 16/436
5,123,768 A * 6/1992 Franklin ...................... 403/96
5,542,151 A * 8/1996 Stranski et al. ............... 16/326
5,551,745 A * 9/1996 Huang ........................ 296/111
5,664,553 A * 9/1997 Chiuminatta et al. ..... 125/13.01
5,680,854 A * 10/1997 Kingsley et al. ......... 125/13.03
5,725,282 A * 3/1998 Masseth et al. ............ 299/39.3
5,810,448 A 9/1998 Kingsley et al.
5,941,227 A * 8/1999 Bearden .................. 125/13.01
6,112,736 A * 9/2000 Bearden .................. 125/13.01
6,318,351 B1 * 11/2001 Baratta ........................ 125/12
6,629,801 B2 * 10/2003 Cheng ........................ 403/101
6,739,798 B2 * 5/2004 Vandewinckel et al. ..... 404/112
6,910,708 B2 * 6/2005 Sack et al. .................. 280/642

(Continued)

*Primary Examiner*—Joseph J Hail, III
*Assistant Examiner*—Alvin J Grant
(74) *Attorney, Agent, or Firm*—Rankin, Hill & Clark LLP

(57) ABSTRACT

An adjustable handle assembly for a road surface cutting saw is provided that includes a back plate attached to the saw housing, an outer gear attached to the back plate, a bracket assembly including an inner gear, a tubular member slidably attached to the bracket assembly, and an adjustment lever having a threaded engagement end. The adjustment lever secures the bracket assembly to the saw such that the inner gear engages the outer gear. When the adjustment lever is loosened a bias spring biases the bracket assembly away from the saw such that the inner gear disengages from the outer gear to thereby allow rotation of the handle assembly to a desired operating position.

14 Claims, 5 Drawing Sheets

U.S. PATENT DOCUMENTS

| | | | | |
|---|---|---|---|---|
| 6,948,197 | B1 * | 9/2005 | Chen | 5/93.1 |
| 7,117,864 | B2 * | 10/2006 | Marques et al. | 125/13.01 |
| 7,418,959 | B2 * | 9/2008 | Kingsley et al. | 125/13.01 |
| 2006/0005826 | A1 | 1/2006 | Kingsley et al. | |
| 2007/0163566 | A1 * | 7/2007 | Johnson et al. | 125/13.01 |

* cited by examiner

HANDLE ASSEMBLY FOR A CONCRETE SAW

BACKGROUND OF THE INVENTION

1. Field of the Invention

The present invention relates to a concrete saw and more specifically to an adjustable handle assembly for a concrete saw.

2. Description of Related Art

In the concrete industry, when building bridges, buildings, roads and the like, it is often necessary to pour large horizontal slabs of concrete. Once poured, it is usually necessary to machine the slab. Such machining may include cutting seams completely through the slab (to form expansion joints and to allow for foundation shifting), cutting notches partially into the slab (to create stress cracks along which the slab will split), cutting multiple grooves into the slab to create a high friction surface such as for bridges, grinding the surface of the slab and the like. Road surface cutting saws, also known as concrete saws, are typically used for this type of application. Concrete saws are also used in the demolition or removal of concrete, such as during the sawing and replacement of bridge decks. Various types of concrete saws may be utilized to carry out these machining and demolition tasks. In larger industrial applications, large self-propelled saws are used that are powered in a variety of manners, such as by gasoline, diesel, electric, propane and natural gas engines mounted on the saw. While performing a cut, the operator controls the direction, cutting speed, cutting depth and the like. One type of saw used to perform the functions described above is disclosed in U.S. Pat. No. 7,117,864 entitled "Mobile Road or Floor Saw," the disclosure of which is herein incorporated by reference.

During operation of the saw the operator walks behind the saw to control the direction, cutting speed, cutting depth, and other operating conditions of the saw. In addition, the operator typically has to maneuver the saw while the saw blade is raised above the concrete. Maneuvering the saw may include turning the saw from side to side to better position the blade, moving the saw from one cutting path to the next cutting path, etc. At least one handle extends from the rear of the saw to allow the operator to maneuver and operate the saw. In order to maneuver the saw the operator pushes the handles in a downward direction toward the concrete. This raises the saw blade above the concrete and allows the operator to pivot the saw about the rear wheels or transport the saw to the next cutting path. When the saw blade, however, is raised above the concrete the operator is typically in an uncomfortable-bent over position thereby making maneuvering the heavy saw more difficult.

It is well known in the industry to provide concrete cutting saws with adjustable handles to permit the operator to adjust the handles to a more desired and comfortable position while maneuvering the saw. Ease of adjustment, however, remains a problem. Thus, what is required is an adjustable handle for a concrete saw that is easy and fast to adjust.

SUMMARY OF THE INVENTION

In accordance with one aspect, the present invention overcomes the above mentioned disadvantages by providing an adjustable handle assembly for a road surface cutting saw comprising a back plate attached to a housing of the saw, an outer gear attached to the back plate, the outer gear defining a center-circular opening, a bracket assembly including an inner gear, a tubular member slidably attached to the bracket assembly, the tubular member having a hand grip, and an adjustment lever having a threaded engagement end. The adjustment lever is inserted through an aperture in the bracket assembly, whereby the threaded engagement end engages a fastener operatively attached to a rear surface of the back plate. When the adjustment lever is rotated in a tightening direction the inner gear engages the outer gear such that the inner gear occupies a space defined by the center-circular opening of the outer gear to thereby rigidly secure the bracket In accordance with another aspect, the present invention provides a bias spring. Thus, when the adjustment lever is rotated in a loosening direction the bias spring biases the bracket assembly away from the saw such that the inner gear disengages from the outer gear to thereby allow rotation of the tubular member to a desired operating position.

In accordance with yet another aspect, the present invention provides a locking knob having a threaded engagement end to secure the tubular member in the bracket assembly. When the locking knob is rotated in a non-locking direction the locking knob disengages the tubular member to thereby allow the tubular member to slide forwardly and rearwardly in the horizontal channel to a desired operating position.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

DETAILED DESCRIPTION OF THE INVENTION

Figure 1:
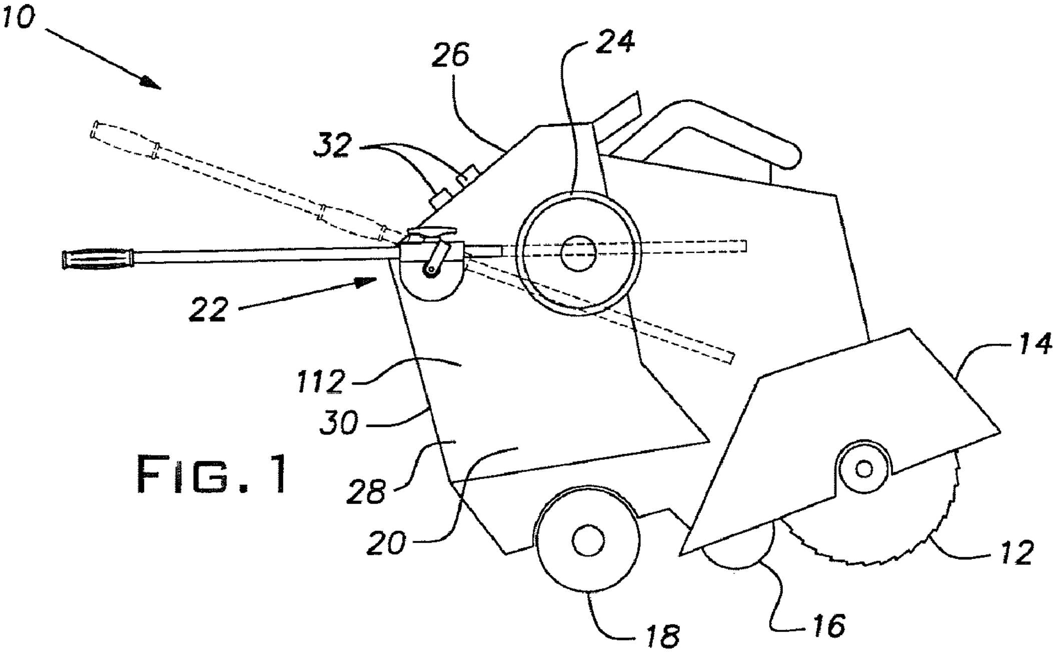
FIG. 1 is a side view of a concrete cutting saw illustrating the orientation of an adjustable handle assembly in accordance with the present invention.

Referring now to the drawings, FIG. 1 shows a side view of a road surface cutting saw or concrete saw 10 used to cut or form a groove or slot in a road surface such as concrete, asphalt or other type of road pavement surface. The saw 10 is of the type commonly known in the art and will be only generally described. The saw 10 includes a motor (not shown) used to drive a transmission (not shown), which in turn drives a circular saw blade 12 rotatably attached to a lower-front portion 14 of the saw 10. The saw 10 further includes front 16 and rear 18 wheels, a housing 20, which houses the motor and transmission, and a pair of adjustable handle assemblies 22 (only one shown) rotatably attached to the housing 20. The saw 10 may include an optional cooling fan 24 to remove hot air from inside the housing 20.

Figure 2:
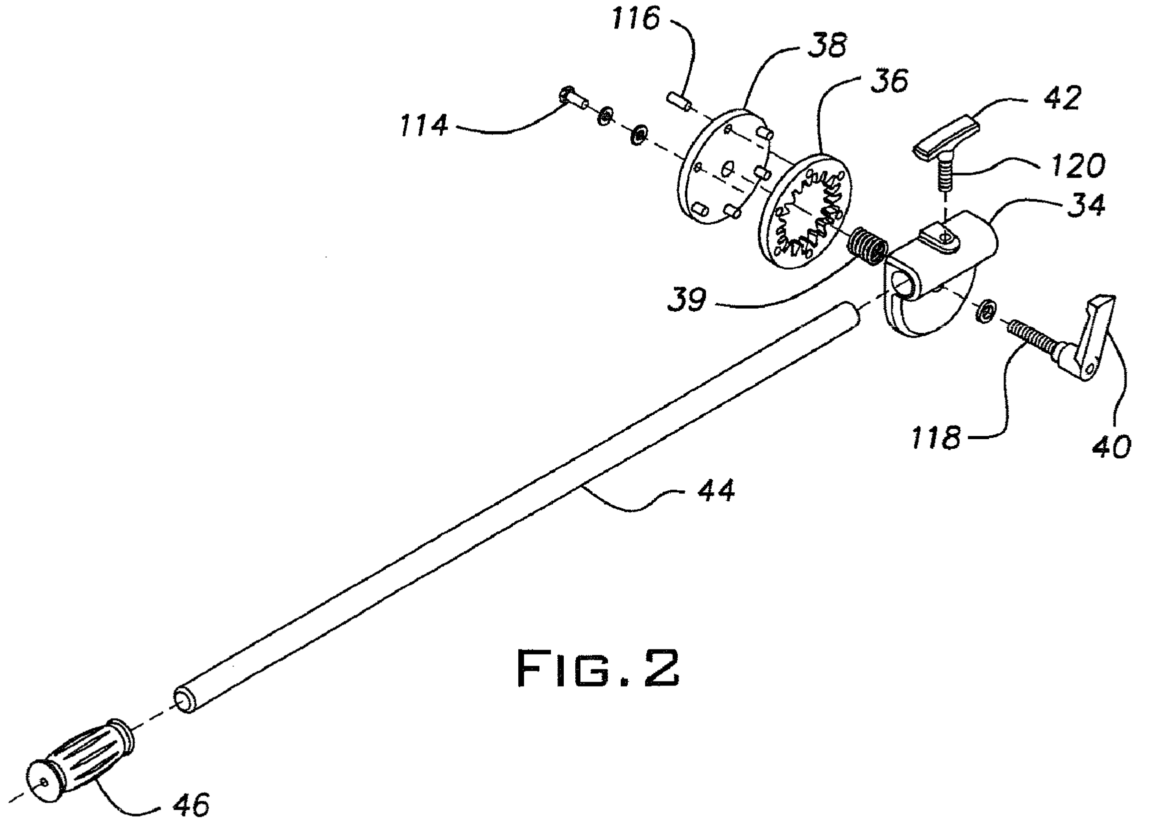
FIG. 2 is an exploded view of the adjustable handle assembly in accordance with the present invention.

Referring to FIGS. 1 and 2, the housing 20 includes a top panel 26, two opposite side panels 28, and a rear panel 30. The top panel 26 includes various control mechanisms 32 to control the operation of the saw 10 such as controlling the forward speed of the saw 10, the speed and/or depth of the blade 12, etc. The pair of adjustable handle assemblies 22 are laterally spaced and generally parallel to one another and extend rearwardly from an upper portion of each opposite side panel 28. Each handle assembly 22 includes a bracket assembly 34, an outer gear 36, a back plate 38, a bias spring 39, which is situated between the bracket assembly 34 and the back plate 38, an adjustment lever 40, a locking knob 42, and a straight-tubular member 44 including a hand grip 46 slidably and removably attached to the distal end of the tubular member 44.

Figure 3A:
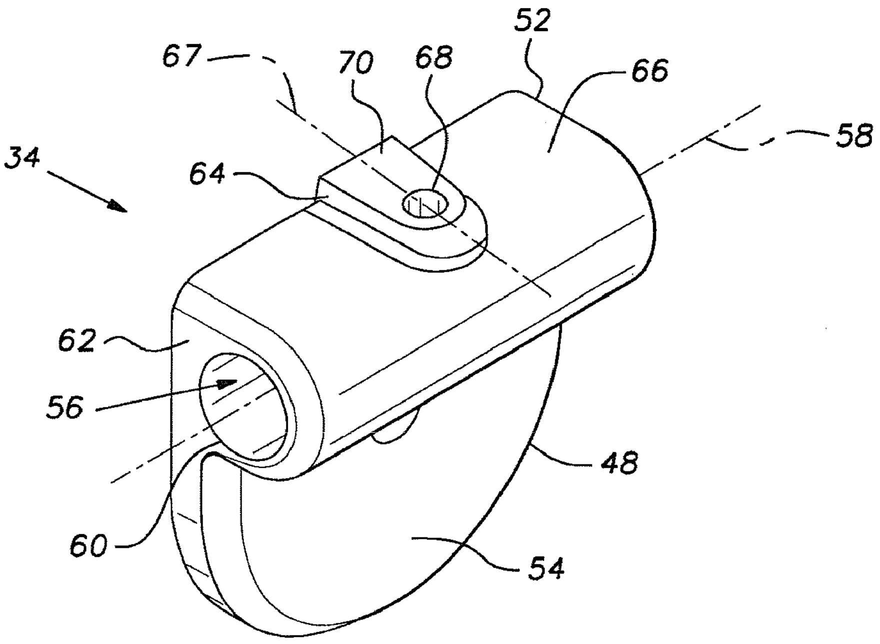
FIG. 3A is a perspective view of a bracket assembly portion of the adjustable handle assembly.
Figure 3B:
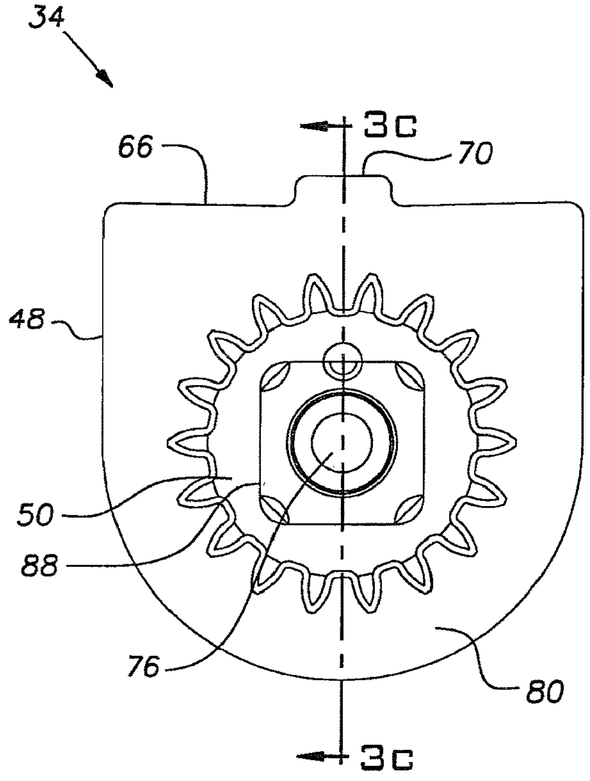
FIG. 3B is a rear view of the bracket assembly of FIG. 3A.
Figure 3C:
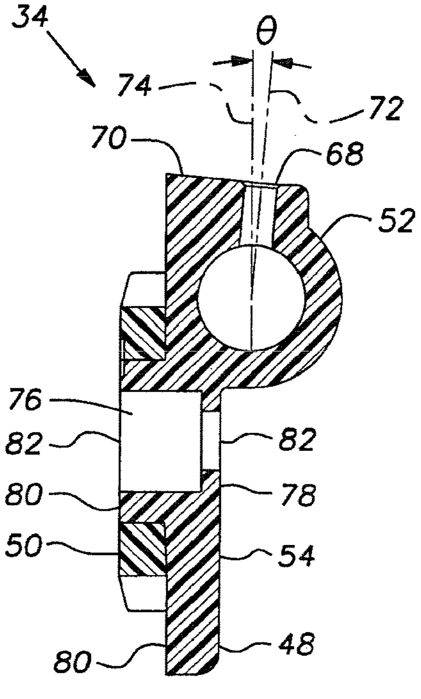
FIG. 3C is a cross-section view of FIG. 3B taken along line 3C-3C.

Referring to FIG. 3A-3C, the bracket assembly 34 includes a bracket 48 and an inner gear 50. The bracket 48 has a generally P-shaped cross-section and includes an upper portion 52 and a lower portion 54. A horizontal-circular channel 56 extends along a longitudinal axis 58 of the upper portion 52 such that an opening 60 is defined at each end 62 of the upper portion 52. A solid U-shaped projection 64 is centrally located on and extends upwardly from a top surface 66 of the upper portion 52. The U-shaped projection 64 has a longitudinal axis 67 that is substantially perpendicular to the longitudinal axis 58 of the upper portion 52. A threaded-circular channel 68, which receives the locking knob 42 (described further below), extends downwardly from a top surface 70 of the U-shaped projection 64 and intersects the horizontal-circular channel 56. The top surface 70 of the U-shaped projection 64 is angled in a downward direction with respect to the top surface 66 of the upper portion 52 such that an angle θ exists between a longitudinal axis 72 of the circular channel 68 and a vertical or y-axis 74. Preferably the angle θ is less than 10° and more preferably the angle θ is approximately 5°.

The lower portion 54 of the bracket 48 is semi-circular in shape and is integrally joined to the upper portion 52. A circular-horizontal aperture 76 extends from a front surface 78 to the rear surface 80 of the lower portion 54 such that an opening 82 is defined in both the front 78 and rear surfaces 80. The circular-horizontal aperture 76 receives the adjustment lever 40, as will be described further below.

Figure 4A:
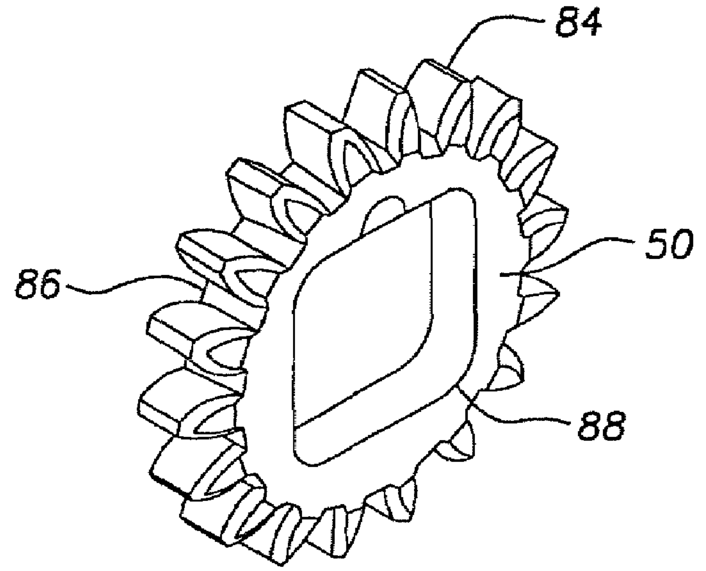
FIG. 4A is a perspective view of an inner gear mounted to a rear side of the bracket assembly.
Figure 4B:
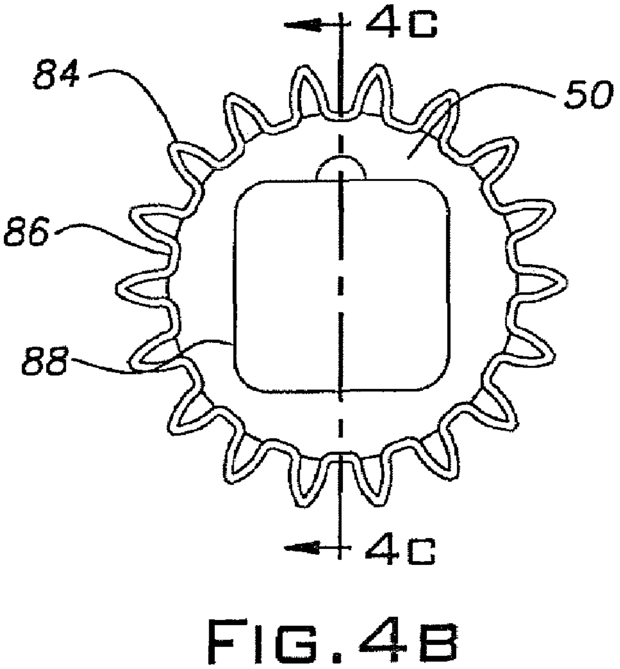
FIG. 4B is a front view of the inner gear of FIG. 4A.
Figure 4C:
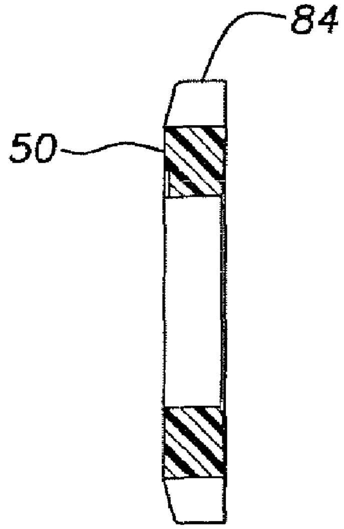
FIG. 4C is a cross-section view of FIG. 4B taken along line 4C-4C.

Referring to FIGS. 4A-4C, the inner gear 50 includes multiple teeth 84 radially extending from a periphery 86 of the inner gear 50. The inner gear 50 is joined to the rear surface 80 of the bracket 48 such that the circular-vertical aperture 76 is centered within a rectangular shaped cutout 88, as shown in FIG. 3C. The inner gear 50 may be joined to the bracket 48 by any means known in the art such as, for example by brazing, welding, etc.

Figure 5A:
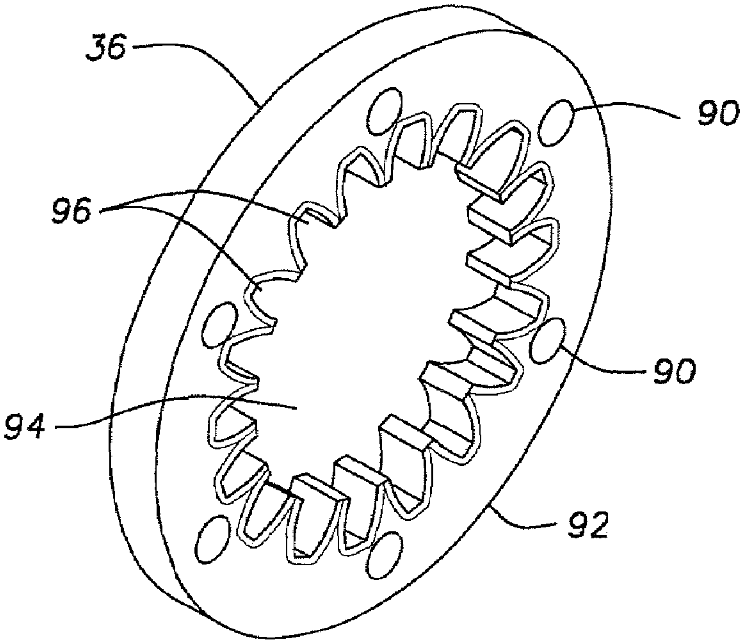
FIG. 5A is a perspective view of an outer gear.
Figure 5B:
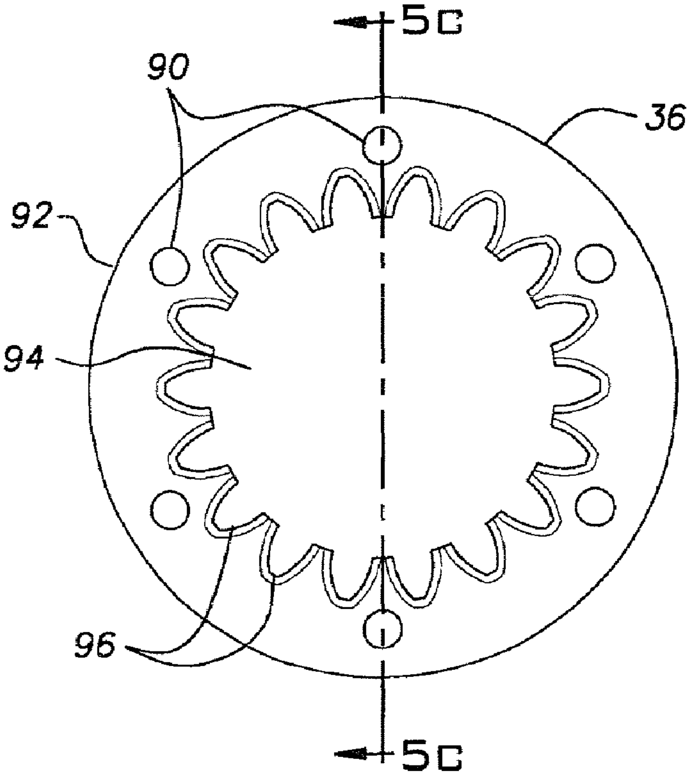
FIG. 5B is a front view of the outer gear of FIG. 5A.
Figure 5C:
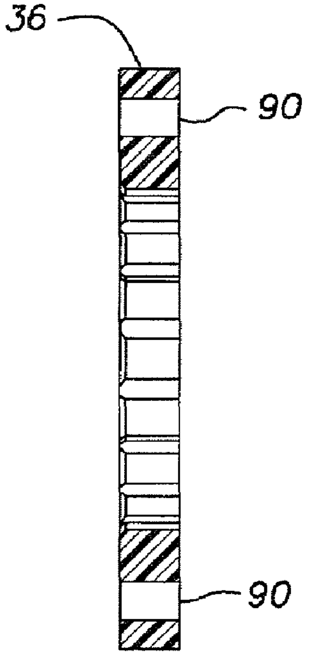
FIG. 5C is a cross-section view of FIG. 5B taken along line 5C-5C.

Referring to FIGS. 5A-5C, the outer gear 36 is circular in shape and includes multiple apertures 90 equally spaced around a periphery 92. The apertures 90 receive a fastener to secure the outer gear 36 to the saw, as will be described further below. A circular opening 94 having a periphery 98 is defined in the center of the outer gear 39. Multiple teeth receiving cavities 96 are equally spaced around the periphery 98 of the circular opening 94. The teeth 84 on the inner gear 50 engage the teeth receiving cavities 96 when the handle assembly is in an assembled state, as will be described further below.

Figure 6A:
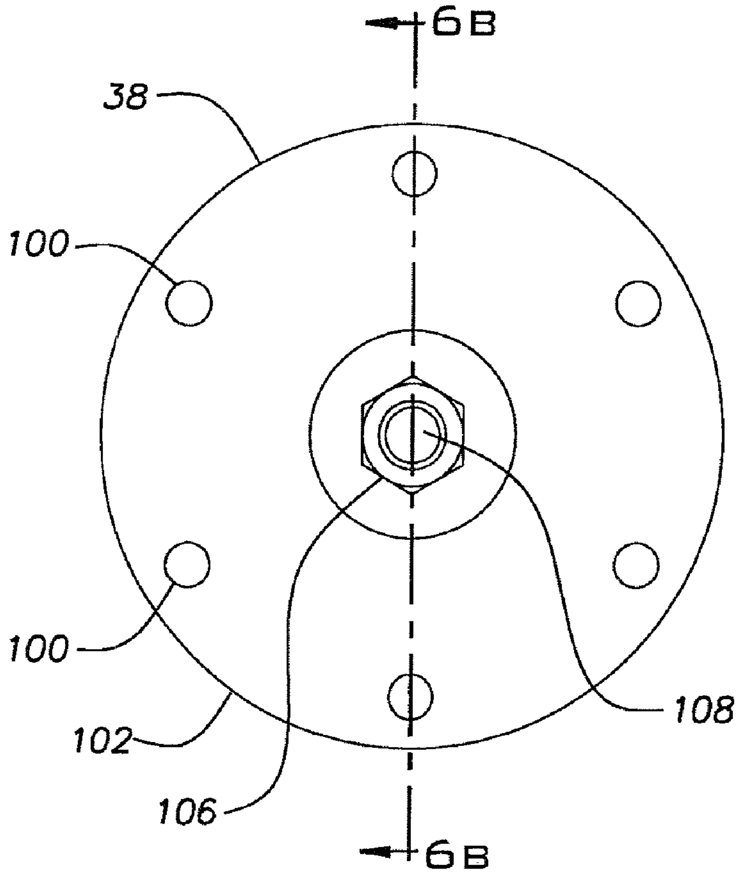
FIG. 6A is a front view of a back plate assembly portion of the adjustable handle assembly.
Figure 6B:
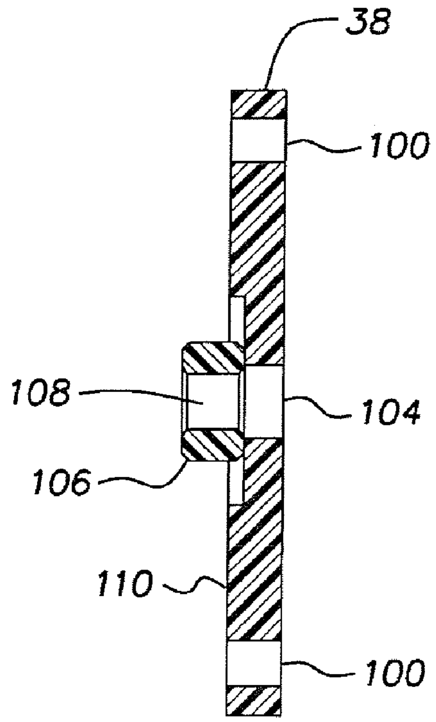
FIG. 6B is a cross-section view of FIG. 6A taken along line 6B-6B.

Referring to FIGS. 6A and 6B, the back plate 38 is circular in shape and includes multiple apertures 100 equally spaced around a periphery 102 of the back plate 38. The apertures 100 in the back plate 38 are arranged such that they are aligned with the apertures 90 on the outer gear 36 when the handle assembly 22 is in an assembled state. A center aperture 104 is defined in the center of the back plate 38 such that the center aperture 104 is aligned with the circular-vertical aperture 76 of the bracket 48 when the handle assembly 22 is in an assembled state.

A fastener 106 having a center aperture 108 is joined to a rear surface 110 of the back plate 38 such that the center aperture 108 of the fastener 106 is aligned with the center aperture 104 of the back plate 38. The fastener 106 can be joined to the back plate 38 by any means known in the art such as, for example by welding, brazing, etc. The fastener 106 may be any type of fastener known in the art such as for example, a clip, bracket, a threaded nut, etc. The fastener 106 shown in FIGS. 6A and 6B is a threaded hexagonal nut and is shown for illustrative purposes only and is not intended to limit the scope of the invention. The fastener 106 receives the adjustment lever 40 as will be subsequently described.

Referring to FIGS. 1 and 2, mounting, assembly and operation of the handle assembly 22 will now be described. The back plate 38 is rigidly secured to an outside surface 112 of each side panel 28 with multiple fasteners 114 such as, for example with screws (as shown in FIG. 2), rivets, etc. The fasteners 114 are inserted from inside the housing 20 through multiple openings (not shown) in each side panel 28. The multiple openings in each side panel are arranged in a circular pattern such that they are aligned with the apertures 100 in the back plate 38. The fasteners 114 are then inserted through the apertures 100 in the back plate 38 and through the apertures 90 in the outer gear 36 such that the back plate 38 is rigidly secured to the side panel 28 and the outer gear 26 is rigidly secured to the back plate 38. As an alternative, dowel pins 116 may be used in place of one or several, but not all, of the fasteners 114 to align the outer gear 36 with the back plate 38. An additional larger opening (not shown) is centrally located within the multiple openings in the side panel 28 such that the larger opening is aligned with the fastener 106 joined to the back plate 38. The diameter of the larger opening is larger than an outside diameter of the fastener 106 such that the fastener 106 fits within the larger opening so that the back plate 38 sits flush against the side panel 28.

To attach and secure the bracket assembly 34 to the saw, the adjustment lever 40 is inserted through the circular-vertical aperture 76 of the bracket assembly 34 and through a center of the bias spring 39 until it engages the fastener 106 on the rear surface 110 of the back plate 38. In the embodiment shown in FIG. 2, the adjustment lever 40 has a threaded engagement end 118, which when rotated in a tightening direction threadedly engages the threaded aperture 108 of the fastener 106 to secure the bracket assembly 34 to the saw 10. When the adjustment lever 40 is rotated in a tightening direction the teeth 84 on the inner gear 50 engage the teeth receiving cavities 96 on the outer gear 36. Thus, the inner gear 50 occupies the space defined by the circular opening 94 and the teeth receiving cavities 96 of the outer gear 36. In the tightened state the inner gear 50 and outer gear 36 are rigidly engaged, which in turn secures the handle assembly 22 to the saw 10 to thereby allow the operator the ability to maneuver the saw 10.

To attach the tubular member 44 to the bracket assembly 34, the tubular member 44 is inserted into the horizontal-circular channel 56 of the bracket 48. A threaded engagement end 120 of the locking knob 42 is inserted into the threaded-circular channel 68. When rotated in a locking direction the locking knob 42 descends into the threaded-circular channel 68 and contacts the tubular member 44 to thereby secure the tubular member 44 within the horizontal-circular channel 56.

To adjust the tubular member 44 in a forward or rearward direction the operator simply rotates the locking knob 42 in a non-locking direction and slides the tubular member 44 forward or rearward in the horizontal-circular channel 56 to a desired operating position, as shown in FIG. 1.

To rotate the tubular member 44 about a pivot point defined by the adjustment lever 40, the operator rotates the adjustment lever 40 in a loosening direction. The bias spring 39 biases the bracket assembly 34 away from the saw 10 such that the inner gear 50 disengages from the outer gear 36. This allows the operator to rotate the tubular member 44 to a desired operating position, as shown in FIG. 1. To reengage the inner gear 50 and the outer gear 36 the operator rotates the adjustment lever 40 in a tightening direction to reengage the inner gear 50 to the outer gear 36.

It should be noted that in a second embodiment (not shown) the handle assemblies 22 can be mounted to the saw 10 such that the handle assemblies 22 incorporate a self leveling feature. For example, the back plate 38 can be mounted to a rotatable axel that extends between the two side panels 22. Thus, during operation of the saw 10, as the blade 12 moves in an up and down direction the handle assemblies 22 can automatically rotate and remain in a substantially horizontal position.

While specific embodiments of the invention have been described and illustrated, it is to be understood that these embodiments are provided by way of example only and that the invention is not to be construed as being limited but only by proper scope of the following claims.

What is claimed is:

1. An adjustable handle assembly for a road surface cutting saw comprising:

a back plate operatively attached to an outside housing surface of the saw;

an outer gear operatively attached to the back plate, the outer gear defining a center-circular opening;

a bracket assembly including an inner gear, the bracket assembly including an integrally formed projecting member;

a tubular member slidably attached to the bracket assembly, the tubular member having a hand grip; and an adjustment lever having a threaded engagement end, wherein the adjustment lever is inserted through an aperture in the bracket assembly, whereby the threaded engagement end threadedly engages a fastener operatively attached to a rear surface of the back plate, and wherein when the adjustment lever is rotated in a tightening direction the inner gear engages the outer gear such that the inner gear occupies a space defined by the center-circular opening of the outer gear to thereby rigidly secure the bracket assembly to the saw, and the inner gear defining a center cutout for receiving the projecting member of the bracket assembly.

2. An adjustable handle assembly for a road surface cutting saw comprising:

a back plate operatively attached to an outside housing surface of the saw;

an outer gear operatively attached to the back plate, the outer gear defining a center-circular opening;

a bracket assembly including an inner gear, the bracket assembly including an integrally formed projecting member;

a tubular member slidably attached to the bracket assembly, the tubular member having a hand grip; and an adjustment lever having a threaded engagement end, wherein the adjustment lever is inserted through an aperture in the bracket assembly, whereby the threaded engagement end threadedly engages a fastener operatively attached to a rear surface of the back plate, and wherein when the adjustment lever is rotated in a tightening direction the inner gear engages the outer gear such that the inner gear occupies a space defined by the center-circular opening of the outer gear to thereby rigidly secure the bracket assembly to the saw, wherein the bracket assembly further includes a bracket, wherein the inner gear is operatively attached to a rear surface of the bracket, wherein the inner gear includes multiple teeth extending radially from a periphery of the inner gear, and wherein the outer gear further includes multiple teeth receiving cavities radially located around a periphery of the center-circular opening of the outer gear, and the inner gear defining a centrally disposed cutout for receiving the projecting member of the bracket assembly.

3. The handle assembly of claim 2 further comprising a bias spring situated between the back plate and the bracket, wherein when the adjustment lever is rotated in a loosening direction the bias spring biases the bracket assembly away from the saw such that the inner gear disengages from the outer gear to thereby allow rotation of the tubular member to a desired operating position.

4. The handle assembly of claim 3 further comprising a locking knob having a threaded engagement end, wherein the threaded engagement end is inserted into a threaded-vertical channel on an upper portion of the bracket, and wherein when locking knob is rotated in a locking direction the locking knob engages the tubular member to secure the tubular member within a horizontal channel in the upper portion of the bracket.

5. The handle assembly of claim 4, wherein when the locking knob is rotated in a non-locking direction the locking knob disengages the tubular member to thereby allow the tubular member to slide forwardly and rearwardly in the horizontal channel to a desired operating position.

6. A concrete cutting saw comprising:

a frame enclosed within a housing;

a motor mounted to the frame;

a transmission driven by the motor;

a cutting blade positioned in a lower-front portion of the saw and driven by the transmission; and an adjustable handle assembly further comprising:

a back plate operatively attached to an outside surface of the housing, the back plate having a center aperture;

a fastener having a threaded aperture, where the fastener is operatively joined to a rear surface of the back plate such that the threaded aperture of the fastener is aligned with the center aperture of the back plate;

an outer gear having a periphery, the outer gear including teeth receiving cavities equally spaced around the periphery;

a bracket having a horizontal aperture;

an inner gear operatively attached to a rear surface of the bracket, the inner gear including equally spaced teeth radially extending from a periphery of the inner gear;

a bias spring situated between the back plate and the bracket;

a tubular member having a hand grip and adjustably attached to the bracket;

an adjustment lever having a threaded engagement end, wherein the adjustment lever is inserted through the horizontal aperture in the bracket and the threaded engagement end engages the threaded aperture on the fastener, and wherein when the adjustment lever is rotated in a tightening direction the teeth on the inner gear engage the teeth receiving cavities on the outer gear such that the inner gear occupies a space defined by a center-circular opening of the outer gear to thereby rigidly secure the handle assembly to the housing.

7. The concrete cutting saw of claim 6, wherein the threaded engagement end of the adjustment lever extends through a center of the bias spring and wherein when the adjustment lever is rotated in a loosening direction the bias spring biases the bracket away from the saw such that the inner gear disengages from the outer gear to thereby allow rotation of the tubular member to a desired operating position.

8. The concrete cutting saw of claim 7, wherein the tubular member is slidably attached within a horizontal channel in an upper portion of the bracket, wherein a U-shaped projection extends upwardly from a top surface of the bracket, and wherein a threaded-vertical channel extends downwardly from a top surface of the U-shaped projection such that the threaded-vertical channel intersects the horizontal channel.

9. The concrete cutting saw of claim 8, wherein the handle assembly further includes a locking knob having a threaded engagement end, wherein the threaded engagement end is inserted into the threaded-vertical channel, and wherein when the locking knob is rotated in a locking direction the threaded engagement end engages the tubular member to secure the tubular member within the horizontal channel.

10. The concrete cutting saw of claim 9, wherein when the locking knob is rotated in a non-locking direction the threaded engagement end disengages the tubular member to thereby allow the tubular member to slide forwardly and rearwardly in the horizontal channel to a desired operating position.

11. The concrete cutting saw of claim 10, wherein the top surface of the U-shaped projection is downwardly angled with respect to the top surface of the bracket such that the an angle exists between a longitudinal axis of the threaded-vertical channel and a y-axis and wherein the angle is preferably less than 10°.

12. The concrete cutting saw of claim 11, wherein the angle is approximately 5°.

13. A method of adjusting a handle assembly for a road surface cutting saw comprising the steps of:

providing a back plate operatively attached to an outside housing surface of the saw, an outer gear operatively attached to the back plate, the outer gear defining a center-circular opening, a bracket assembly including an inner gear, the bracket assembly including an integrally formed projecting member and the inner gear defining a central cutout within which is disposed the projecting member, the inner gear engaging the outer gear, a bias spring situated between the back plate and the bracket assembly, a tubular member slidably attached to the bracket assembly, the tubular member having a hand grip, and an adjustment lever having a threaded engagement end;

rotating the adjustment lever in a loosening direction;

biasing the bracket assembly away from the back plate;

disengaging the inner gear from the outer gear;

rotating the bracket assembly about a pivot point defined by the adjustment lever;

positioning the tubular member in a desired operating position;

rotating the adjustment lever in a tightening direction;

re-engaging the inner gear and the outer gear, and securing the bracket assembly to the saw in the desired operating position.

14. The method of claim 13, wherein the handle assembly further includes a locking knob having a threaded engagement end to secure the tubular member in the bracket assembly the method further comprising the steps of:

rotating the locking knob in a non-locking direction;

disengaging tubular member;

sliding the tubular member forwardly or rearwardly in a horizontal channel of the bracket assembly to a desired operating position;

rotating the locking knob in a locking direction;

re-engaging the tubular member, and securing the tubular member in the desired operating position.

* * * * *